US006214063B1

(12) United States Patent
DeStefano et al.

(10) Patent No.: US 6,214,063 B1
(45) Date of Patent: Apr. 10, 2001

(54) PRODUCTS WITH ETPA-BASED ICONS

(75) Inventors: Fabian DeStefano; Kirsten Klett; Elizabeth B. Johnson, all of Columbus, OH (US)

(73) Assignee: Bath & Body Works, Inc., Reynoldsburg, OH (US)

( * ) Notice: Subject to any disclaimer, the term of this patent is extended or adjusted under 35 U.S.C. 154(b) by 0 days.

(21) Appl. No.: 09/516,140

(22) Filed: Mar. 1, 2000

(51) Int. Cl.[7] .................................................. C10L 5/00
(52) U.S. Cl. .................................................. 44/275
(58) Field of Search ................................. 44/275; D26/6

(56) References Cited

U.S. PATENT DOCUMENTS

D. 411,891 * 6/1999 Bell et al. ............................ D26/6
4,332,548 * 6/1982 Linton et al. ....................... 431/289
5,783,657 * 7/1998 Pavlin ................................. 528/310
6,033,210    3/2000 Freeman .

OTHER PUBLICATIONS

Candlemart.com—www.candlemart.com.*

* cited by examiner

Primary Examiner—Margaret Medley
Assistant Examiner—Cephia D. Toomer
(74) Attorney, Agent, or Firm—Colluci & Umans; Peter C. Michalos; Angelo Notaro

(57) ABSTRACT

A decorative product has at least one, but preferably many solid icons made of ester-terminated polyamide (ETPA) and low-polarity liquid such as mineral oil. A clear medium such as clear ETPA-based polymer, is around the icon. The medium may be in a clear jar and a wick may extend through the medium to form a candle.

14 Claims, 3 Drawing Sheets

PRODUCTS WITH ETPA-BASED ICONS

FIELD AND BACKGROUND OF THE INVENTION

The present invention relates in general to decorative household products such as candles and room fresheners, and in particular to a new and useful product with a clear fill or matrix containing one or more solid shapes or icons. A preferred form of the invention is a candle in a glass jar that simulates a jar of fruit or other identifiable items. The fruit or other shapes or icons are made of material which is based on ester-terminated polyamide or ETPA.

U.S. Pat. No. 5,338,187 to Elhara discloses a solid wax plug at the top of a chamber containing combustible oil. A wick from the wax extends into the oil.

U.S. Pat. No. 4,427,366 to Moore discloses a central core candle of wax surrounded by fragrance containing wax chips or pieces, all received within a candle holder of glass or ceramic.

U.S. Pat. No. 5,693,277 to Widmer discloses the inclusion of solid chunks of wax at the flat side walls of a wax candle.

U.S. Pat. No. 4,826,428 to Lam discloses a candle made of a stack of small wax pieces.

U.S. Pat. No. 5,395,233 to Karp discloses a pillar candle having a core wax candle surrounded by a transparent wax shell forming an annular gap. Potpourri and more transparent wax fills the annular gap so that the potpourri is visible. The core wax candle is sufficiently large so that the shell does not burn when the core candle burns.

A candle with differently colored outer layer and inlays around an inner wax filler is taught by U.S. Pat. No. 5,632,615 to DeGarmo.

U.S. Pat. No. 5,597,300 to Wohl et al. discloses a multiple layer wax candle having an outer shell formed from layers of a high-melting point wax. An inner core of the candle is combustible and replaceable within the outer shell. Decorative designs may be formed in the outer shell. The candle is formed by molding the outer layers followed by filling the shell with the inner core candle and a wick.

U.S. Pat. No. 4,855,098 to Taylor discloses a candle composition having two paraffin waxes with particular melting point ranges combined with a small percentage of a stretchability enhancer. The stretchability enhancer is either a polymer or microcrystalline wax having a melting point between 120–130° F.

U.S. Pat. No. 4,568,270 to Marcus et al. teaches a fragrance candle having an outer wax shell surrounding an inner core containing a wick. The inner core is another petrolatum, low-melting point wax or paraffin mixed with 5–12% by weight of a fragrance. The outer wax shell acts as the container for the candle.

U.S. Pat. No. 5,578,089 to Elsamaloty teaches a clear candle formed from a composition which includes mineral oil combined with a particular type of polymer. The mineral oil is mixed with these polymers to form a clear polymer body that holds a wick and combusts like a candle.

U.S. Pat. No. 4,937,701 to Schroder discloses a safety device for burning candles composed of an outer clear vessel holding a first liquid, such as water, surrounding a second vessel containing a smaller amount of cooling liquid and a candle.

U.S. Pat. No. 2,279,137 to Guilfoil, Jr. shows a candle formed within a clear container having ribs to enhance the combustion properties of the candle.

Non-wax materials for creating candles are also known. U.S. Pat. No. 5,783,657 to Pavlin, et al., assigned to Union Camp Corporation of Wayne, New Jersey, discloses a polymer which is based on ETPA and which is usable, among other things, as a substitute for wax. ETPA-based polymer burns in a manner similar to wax. The contents of U.S. Pat. No. 5,783,657 is incorporated here by reference for its disclosure of the composition and manner of manufacturing ETPA-based materials. ETPA is also commercially available from Union Camp Corporation and is identified by their trademark UNICLEAR.

SUMMARY OF THE INVENTION

A preferred embodiment of the present invention comprises an outer transparent jar such as a mason jar, containing a transparent matrix or fill of clear ETPA polymer with fruit-shaped or other icons that are also based on ETPA but with color, distributed in the matrix.

The invention may also be in the form of a clear pillar candle containing the ETPA-based icons or simply a matrix without a wick or other candle function but with the distribution of one or more icons therein to form a household, decorative and/or fragrant product.

The icons are manufactured using a rubber or silicon molding process and using the ETPA material with coloring and other ingredients.

The solid icons are placed in the jar or in a mold, with or without a wick, and then molten ETPA mixture is added to form the clear matrix or fill. The excess wick is trimmed to the top edge of the jar where a jar and wick are present.

In the present invention the term "fruit icon" is meant to include fruit, vegetables and other botanical items that can be mimicked using the molded ETPA material. When the term "icon" is used alone it is meant to include any three-dimensional shape including not only fruit icons but also figurines, geometric shapes, and the like.

According to some of the novel features of the present invention, it has been found that a special formulation of the ETPA material used to create the solid molded icons can be tailored to permit the pouring of a differently formulated clear, color or colorless ETPA matrix or fill around the icons in the jar or in a mold, without deforming the icons.

Another object of the invention is to provide a method of making the product with ETPA-based icons.

A still further object of the invention is to provide a product with ETPA-based icons which uses a fill or matrix which is solid or liquid and which may or may not be based on ETPA.

The various features of novelty which characterize the invention are pointed out with particularity in the claims annexed to, and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
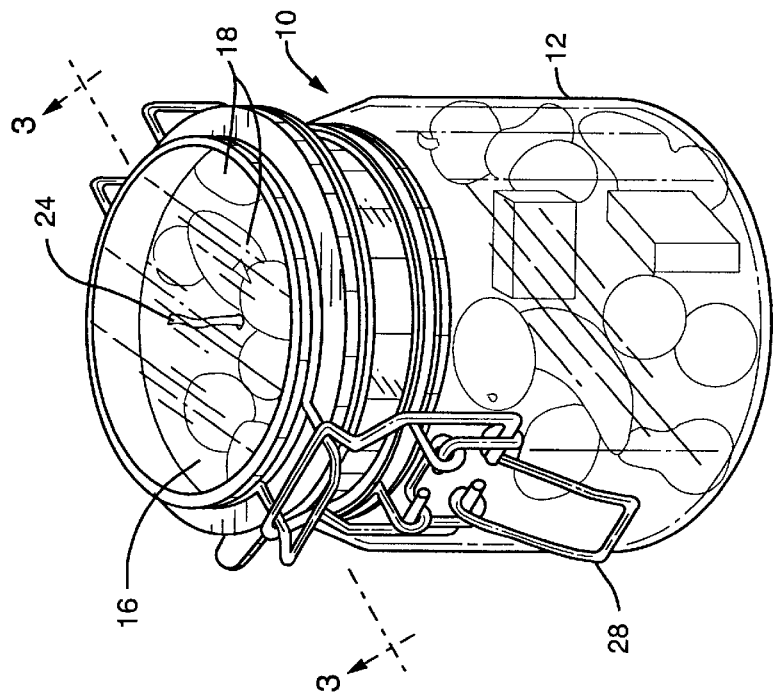
FIG. 1 is a perspective view of an improved jar candle of the present invention with its lid open and its wick burning.
Figure 2:
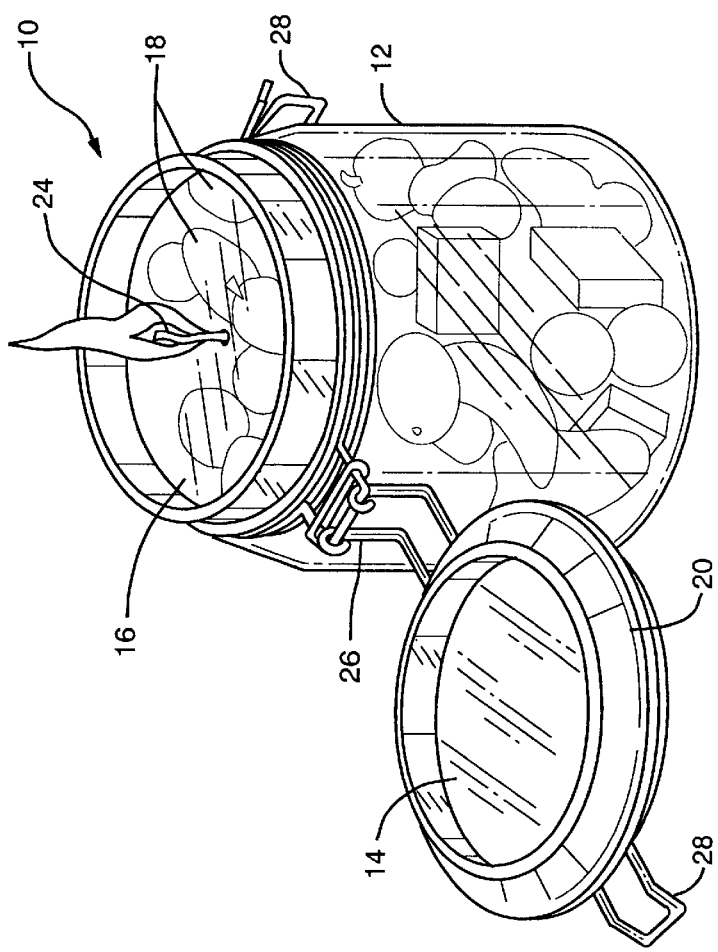
FIG. 2 is a view similar to FIG. 1 with the lid closed.
Figure 3:
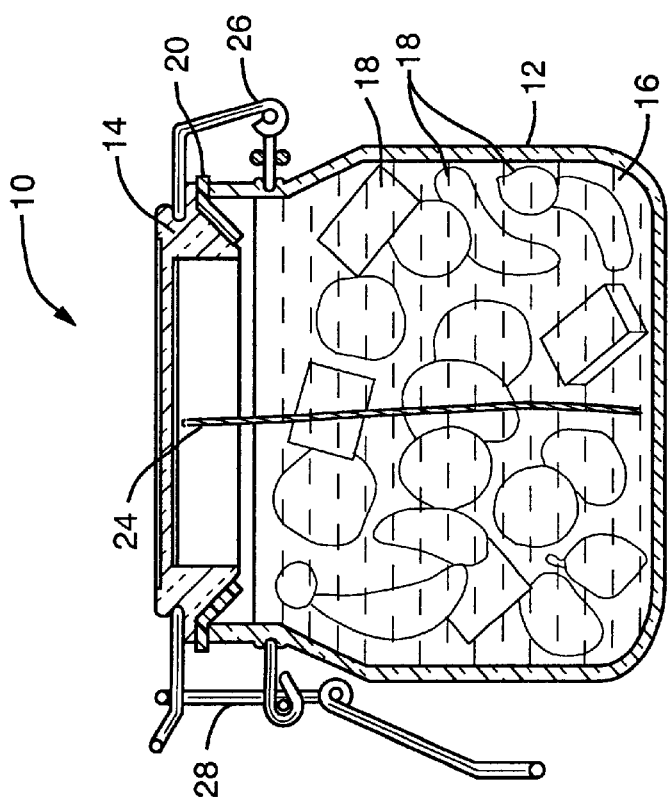
FIG. 3 is a sectional view of the jar candle of the present invention.

Referring to the drawings, the invention embodied in FIGS. 1–3, comprises a jar candle generally designated 10 having a glass jar 12 preferably in the form of a mason jar having a removable glass lid 14 with or without a rubber ring seal 20 around the neck of the lid. The lid in FIG. 1 is in its open position with wick 24 burning to burn the fuel making up the filling and icons in the jar. The fuel is a clear fill 16 plus icons 18 in the jar.

Icons 18 which are shown in the form of fruits or fruit shapes, may be made in any shape including geometric shapes, figurines or the like. Each shape is cast using a rubber or silicon mold technique and made of ETPA-based fuel that can burn. In this way, all of the contents of the jar 12 can be eventually consumed by the flame.

Lid 14 is held by a bail wire system including a multi part bail wire hinge 26 and a multi part bail wire latch 28 of known construction and particularly known in the field of mason jars. The added advantage is that with the lid closed as shown in FIGS. 2 and 3, the fragrance from the candle may be sealed. It has been found, however, that a perfect seal may not be desirable since a small air circulation over the top of the filling 16 may avoid degradation of the ETPA-based fuel. Rubber seal 20 is thus eliminated in the preferred form of the jar candle.

Wick 24 is selected to optimize burning characteristics and stiffness, to avoid the wick bending over during the burning process. This avoids any danger to the glass jar and also improves the aesthetic quality of the flame. A metal clip 22 is provided at the bottom of the wick and held by adhesive to the inside surface of the floor of the jar in the step of FIG. 4.

Figure 5:
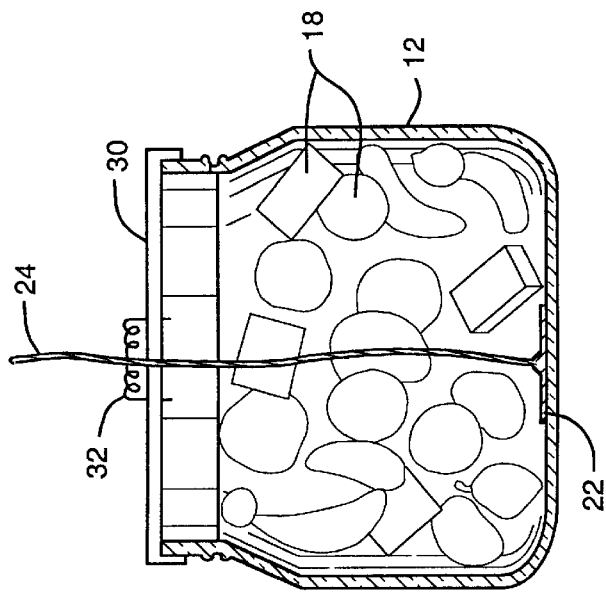

A plastic U-shaped jig 30 with a coil spring 32 is used to hold the top of the wick 24 upright in jar 12 in the step of FIG. 5.

Fill 16 in jar 12 simulates nectar around the simulated fruit 18 or the look of fruit suspended in the nectar. Fill 16 is an ETPA-based polymer.

The process for making the fruit icons starts when real fruits are placed onto a tray (not shown). A rubber or silicone compound is then poured over the fruits. The combination is placed in a vacuum chamber and the air is removed from the compound which helped the rubber take the contour and texture of the fruit. The combination is then allowed to dry in the vacuum for several hours and allowed to age. The rubber is then cut open and the fruit removed to form a mold. Then an ETPA-based material with pigment is poured into the mold. The mold is then allowed to cool to harden the ETPA material and form the icons which are then removed from the mold.

Non-limiting examples of the fruit icons include tangerines, strawberries, raspberry, mixed berries, cucumbers, melons, apples and cinnamon stick shapes. This list is not exhaustive since any other shape is also possible. A further embodiment of the invention may include botanical icons such as flowers, branches, leaves and the like, or any other shapes.

Before disclosing the detailed composition and method of the invention, the following general comments are made.

The ETPA ingredient known by the trademark UNI-CLEAR 80, purchased from Union Camp or its related companies, is present in an amount of at least 18 percent and as much as 65 percent by weight content in the icon portion and in the fill or matrix portion, and this range of ETPA ingredient is also the same for a overpour layer on the top of the main fill. The overpour layer has a higher fragrance content and is approximately 3 to 8 millimeters thick (about 15 grams of the liquid) to provide a higher concentration of fragrance when the container is first opened. Mineral oil is also present in the ETPA mixture to improve the burning characteristics and also to reduce the overall cost. The mineral oil in the candle versions of the invention allows one to use a conventional diameter wick than the wick one would normally need to get a reasonably sized flame in the candle using UNICLEAR 80 material alone. Other low-polarity liquids may replace the mineral oil.

Hexylene Glycol is also present in the main fill and the overpour to stabilize the formula. If the formula is exposed to air, a white dust may appear on the surface due to the migration of one or more of the components; the Hexylene Glycol prevents this migration. Hexylene Glycol is not used in the icon formula because the icons are not exposed to air. The presence of the Hexylene Glycol also reduces the firmness of the formula, making it undesirable for the icon production. In other words, the Hexylene Glycol would make the icons "mushy" causing deformation in the demolding and assembling processes. Myristic acid (an organic acid) is also present only in the fill and not in the icons. The myristic acid is present in the main fill and overpour to avoid cloudiness and keep the fill clear. It is not needed in the icons since the icons are opaque. In some embodiments of the invention, the icons can be transparent, requiring some myristic acid in the icons as well.

Capric/Caprylic Triglyceride is a fatty acid that is present in the fill formula to decrease the viscosity. This decrease helps in various ways: The formula flows better in production; the formula is more "flexible" around the icons and in the glass container (and more resilient to temperature fluctuations, minimizing the potential for cracking); and it improves the burn characteristics by lowering the melting point.

Pigments are used in the icons only and no pigments are in the fill. Dyes are used in the fill and overpour, but not in the icon. Pigments are used in the icons because pigments tend to be more resistant to "bleeding" into the surrounding fill. This resistance stems from the fact that pigments are dispersed (insoluble) in the medium whereas dyes are dissolved (soluble) therein.

Pigment, e.g. CM 65 RED from J & E Polish Co., is added to the icon material. This pigment is pre-dissolved in microcrystalline wax which is in soft, low-melting point slabs that are melted in the icon material. Violet dye such as the Violet FBL powder known as SANDOPLAST from Clariant of North Carolina is used in the fill to offset its yellow tint and make it look colorless and clear.

AS noted above, Hexylene Glycol is added to adjust the viscosity of the fill to give the fill pliability and to avoid deformation when thermal expansion and contraction take place when the candle is lit. The fill will thus also accommodate changes in shape and size of the icons. Also, if the icons crack it is less damaging to the appearance than if the fill cracks. Other glycols or viscosity adjusters can be used instead of the Hexylene Glycol.

Another option is to include a pillar candle of wax or other material in the center, with the icons and fill around the pillar candle and in the jar or a mold. The presence of any paraffin-based wax debris while the ETPA material is hot, however, can cause immediate clouding of the fill where the debris melts. The size of the debris is what causes it to melt quickly, neither a paraffin core nor paraffin icons cause a problem due to their difference in surface area. As will be explained, the fill is at a temperature of about 70 C. to 90 C. and is added to the mold or jar containing the preformed icons which are already solid and are sitting in the mold or container.

Returning to the method of making the fill, after fragrance is added, followed by agitation, the dye is added. It was found that five hours was the maximum time permitted to get the fragrance and dye mixed and into the container. If the filling step was not done in this time, yellowing took place in the fill. Hardening, however, takes place very quickly, about 5–8 minutes, and then it is important to add the overpour, but only after the bottom layer or main fill has hardened to make sure the overpour or layer stays on the top. The jig 30,32 of FIG. 5 holds the wick centered and upright so that the icons and the fill can be added to the jar or mold without displacing the wick.

During the fill step the jar or mold is heated. It was found that this helps avoid air pockets between the inner surface of the glass or mold material and the outer surface of the fill.

Other fills can also be used with the ETPA icons. The fill can be liquid. It can be mineral oil or water, for example. The fill must only be chemically and mechanically compatible with the icons. In other words the fill must not dissolve, deform, distort or damage the icons or cause color to bleed from the icons.

Compositions

The compositions of the icons, clear or main fill and overpour, are disclosed in the following tables.

TABLE 1

ICONS

| Ingredient | Preferred % by Weight | Permitted Range (wt %) |
| --- | --- | --- |
| UNICLEAR 80 ETPA | 52.75 | 18–65 |
| Mineral Oil #7 | 44.74 | 35–82 |
| Capric/Caprylic Triglyceride | 0.00 | 0 |
| Myristic Acid | 0.00 | 0 |
| Hexylene Glycol | 0.00 | 0 |
| Fragrance | 2.50 | 0.1–12.0 |
| Pigment | 0.01 | 0–1 |
| Dye | 0.00 | 0 |

TABLE 2

MAIN FILL

| Ingredient | Preferred % by Weight | Permitted Range (wt %) |
| --- | --- | --- |
| UNICLEAR 80 ETPA | 31.25 | 18–65 |
| Mineral Oil #7 | 37.25 | 20–75 |
| Capric/Caprylic Triglyceride | 25.00 | 0–35 |
| Myristic Acid | 2.00 | 0–7 |
| Hexylene Glycol | 2.00 | 0–7 |
| Fragrance | 2.50 | 0–12 |
| Pigment | 0 | 0 |
| Dye | 0.01 | 0–1 |

TABLE 3

OVERPOUR

| Ingredient | Preferred % by Weight | Permitted Range (wt %) |
| --- | --- | --- |
| UNICLEAR 80 ETPA | 29.91 | 18–65 |
| Mineral Oil #7 | 35.65 | 20–75 |
| Capric/Caprylic Triglyceride | 23.92 | 0–35 |
| Myristic Acid | 1.91 | 0–7 |
| Hexylene Glycol | 1.91 | 0–7 |
| Fragrance | 6.70 | 0–12 |
| Pigment | 0.00 | 0 |
| Dye | 0.01 | 0–1 |

In a preferred form of the invention in the form of a candle jar, one pound of material (453.59 grams) is used. Of this, the fragrance can be provided half in the icons and half in the fill, with half the weight of the jar contents being icons and half being fill (including main and overpour). Of this, 15 grams is overpour with the remainder of the fill component being main fill.

Procedure for the Icons

The method of making the fragranced icons is as follows:
Heat mineral oil to 90–100 C. in a mixing kettle. Add the UNICLEAR 80 ETPA and wait until it is totally melted. Start agitation in mixer until the mix is homogeneous. Control the temperature to be between 90–95 C. Add the fragrance and agitate until the mix is homogeneous. Add the pigments and mix until the bulk is homogeneous. Maintain temperature between 85–90 C. to avoid any bulk discoloration and preserve fragrance integrity.

Procedure for the Clear and Overpour

The procedure for making the clear or main fill is as follows:

Heat mineral oil to 90–100 C. in the mixer. Add the UNICLEAR 80 ETPA and wait until it is totally melted. Start agitation until the mix is homogeneous and the product is transparent. Control the temperature to between 90–95C. Add the triglyceride, myristic acid and hexylene glycol. Maintain temperature at 85–90 C. to avoid any bulk discoloration. Agitate until the mix is homogeneous and transparent.

Add the fragrance and agitate until the mix is homogeneous and add the dye. This fill mixture is kept at 70–90 C. and poured into the jar over the icons after the icons are loaded into the jar. Where a free standing product is being made, a mold is used instead of a jar. For a free standing or "pillar" product, the fill is made with a formula that is more like the icon formula, namely without the triglyceride component and without the myristic acid component, but with the hexylene glycol component.

The overpour is made by following the same procedure, but increasing the component of fragrance added and decreasing the ETPA and mineral oil component.

Although mineral oil is used in the preferred embodiment of the icons and fill, any other hydrocarbon or other non-aqueous liquid can be used as disclosed in U.S. Pat. No. 5,783,657. This component will be referred to generically as the load-polarity liquid which is the generic term for this component used in U.S. Pat. No. 5,783,657.

Process for the Candle Jar

Figure 4:
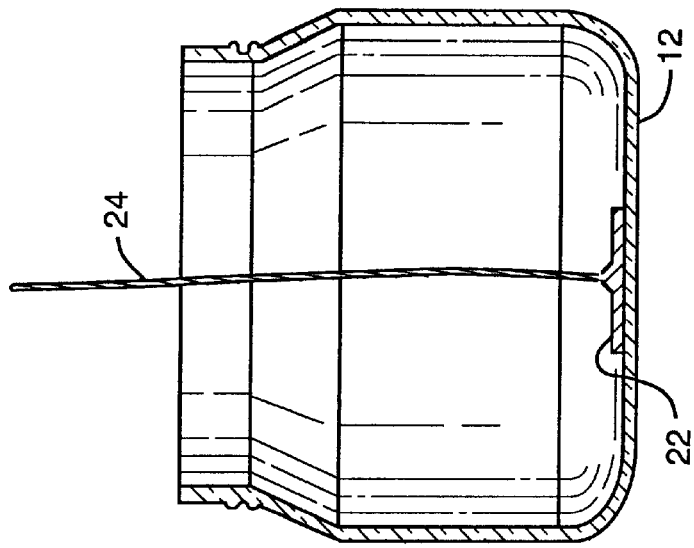
FIGS. 4, 5 and 6 are sectional views of the candle FIG. 3 during various steps of manufacture.

The process for manufacturing the candle of FIG. 1 is as follows:

A bottom pad (e.g. a label, not shown) is applied to the bottom of the jar and the metal clip 22 which is fixed to the lower end of the wick 24 is glued in place on the pad (FIG. 4). Holder or jig 30 is placed over the bottle opening and the upper end of wick 24 is wrapped over spring 32 to be caught between the coils of the spring. Icons 18 which have been previously formed and allowed to harden are then dropped into jar 12 around the wick with the jig 30 still in place (FIG. 5).

Figure 6:
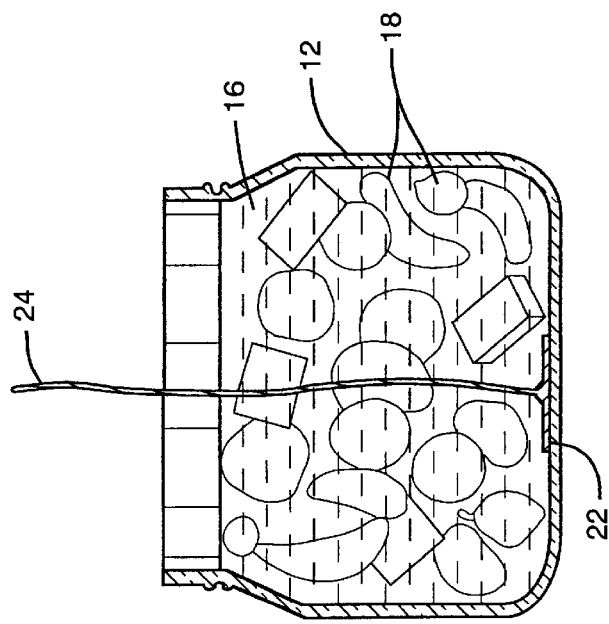

The jar with icons and wick is then heated in a heat tunnel to about 65 C. The main or clear fill is then poured into the jar at a temperature of about 70 C. to 90 C., up to near the top opening of the jar as shown in FIG. 6. Thereafter, the main fill is allowed to cool and harden and the molten overpour, which has the higher fragrance content, is poured on to the main fill.

The wick holder is removed, the wick is cut, the wire bail is applied, the lid is attached and the jar is closed (FIG. 2).

In an alternate embodiment of the invention, the same technique is used, but a mold replaces the jar and no wick is present. With as few as one icon made in accordance with the foregoing composition placed into the mold, and the mold being cubicle or square, the product of FIG. 7 can be created. Any mold shape and any icon shape can be used.

A still further alternate embodiment utilizes an outer clear container, ETPA-based icons and a liquid fill.

Figure 7:
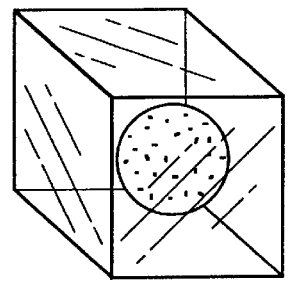
FIG. 7 is a perspective view of another embodiment of the invention.

An example of a non-ETPA-based polymer which can be used as the fill in FIG. 7 is disclosed in U.S. Pat. No. 5,679,334, assigned to Bath & Body Works, Inc., and entitled GEL AIR FRESHENER AND MAKING THE SAME. This patent discloses a fragranced and clear polymer which is chemically and mechanically compatible with the ETPA-based icons and can be used to create the product of FIG. 7 which can function as a decorative air freshener.

In its simplest form, thus the invention is a decorative product which comprises an ester-terminated polyamide plus low-polarity liquid composition forming a solid icon and a clear medium around the icon. The clear medium may be solid, such as the polymers identified above, or liquid and may simply be water in a container which is preferably clear with one or more icons in the liquid. The icons can even float in the liquid. Alternatively, the clear medium may contain other structures, such as a pillar candle which has better burning characteristics if it is made of paraffin wax, which is surrounded by a clear medium containing one or more of the ETPA-based icons.

While specific embodiments of the invention have been shown and described in detail to illustrate the application of the principles of the invention, it will be understood that the invention may be embodied otherwise without departing from such principles.

What is claimed is:

1. A decorative product comprising:

at least one solid icon made of ester-terminated polyamide and low-polarity liquid and containing fragrance and pigment; and a clear medium around the icon, the clear medium being a polymer of ester-terminated polyamide, low-polarity liquid, fatty acids and a fragrance.

2. A decorative product according to claim 1, including a plurality of said icons in the clear medium.

3. A decorative product according to claim 1, including a clear container around the clear medium.

4. A decorative product according to claim 1, including a wick extending in the clear medium.

5. A decorative product according to claim 4, including a clear container around the clear medium.

6. A decorative product according to claim 1, wherein the medium contains a wick extending therein to form a candle, and a clear container around the clear medium.

7. A decorative product according to claim 6, wherein the icon and the medium each contain about 18–65 wt % ester-terminated polyamide.

8. A decorative product according to claim 7, wherein the low-polarity liquid is mineral oil and is present in the icon and the medium in an amount of about 30–85 wt %.

9. A decorative product according to claim 1, wherein the icon is a fruit icon.

10. A decorative product comprising: at least one icon made of ester-terminated polyamide and low-polarity liquid, and a clear medium around the icon, the clear medium being a polymer of ester-terminated polyamide and low-polarity liquid, the polymer of ester-terminated polyamide and low-polarity liquid of the clear medium also includes a triglyceride, a glycol and an organic acid.

11. A decorative product according to claim 10, wherein the clear medium includes a wick for burning the clear medium, fatty acids and a fragrance.

12. A decorative product according to claim 10 wherein the organic acid is myristic acid.

13. A decorative product according to claim 10 including a plurality of solid icons in the clear medium.

14. A decorative product according to claim 10 including a clear container around the clear medium.

* * * * *